United States Patent
Chen et al.

(10) Patent No.: US 9,462,293 B1
(45) Date of Patent: Oct. 4, 2016

(54) SUPER RESOLUTION WEIGHTING BLENDING

(75) Inventors: Junhua Chen, Shanghai (CN); Neil D. Woodall, Newport Beach, CA (US)

(73) Assignee: PIXEL WORKS, INC., Portland, OR (US)

( * ) Notice: Subject to any disclaimer, the term of this patent is extended or adjusted under 35 U.S.C. 154(b) by 1200 days.

(21) Appl. No.: 13/303,660

(22) Filed: Nov. 23, 2011

(51) Int. Cl.
  *H04N 7/12* (2006.01)
  *H04N 19/523* (2014.01)
  *H04N 19/53* (2014.01)

(52) U.S. Cl.
  CPC .......... *H04N 19/523* (2014.11); *H04N 19/53* (2014.11)

(58) Field of Classification Search
  CPC .............. G06T 5/50; G06T 5/003; G06T 2207/10144; G06T 2207/20144; G06T 2207/20201; G06T 2207/10024; H04N 5/23254; H04N 5/2327; H04N 5/23248; H04N 19/523; H04N 19/53
  USPC ............ 348/208.4, 222.1, 448, 416, 207.99; 375/240.01, 240.16; 353/122; 382/233, 382/263; 707/104.1
  See application file for complete search history.

(56) References Cited

U.S. PATENT DOCUMENTS

| | | | |
|---|---|---|---|
| 8,422,550 B2* | 4/2013 | Li | 375/240.01 |
| 2005/0046702 A1* | 3/2005 | Katayama et al. | 348/222.1 |
| 2005/0206785 A1* | 9/2005 | Swan et al. | 348/448 |
| 2005/0243203 A1* | 11/2005 | Swan | 348/448 |
| 2006/0167940 A1* | 7/2006 | Colton et al. | 707/104.1 |
| 2007/0035707 A1* | 2/2007 | Margulis | 353/122 |
| 2008/0088711 A1* | 4/2008 | Border et al. | 348/222.1 |
| 2009/0195664 A1* | 8/2009 | Mowry | 348/207.99 |
| 2010/0046846 A1* | 2/2010 | Brown | 382/233 |
| 2010/0183238 A1* | 7/2010 | Ayzenberg et al. | 382/263 |

* cited by examiner

*Primary Examiner* — Young Lee
(74) *Attorney, Agent, or Firm* — Marger Johnson

(57) ABSTRACT

A method of receiving video data receives an original image at a processing device, estimates an image of higher resolution than the original image from the original image, generate a simulated image of the original image from the higher resolution image, derives difference data between the original image and the simulated image, upscale the difference data, wherein upscaling includes weighting the difference data with an adjusted confidence value, wherein the confidence value is adjusted based upon local information, and uses the upscaled difference data to estimate a new higher resolution image.

8 Claims, 3 Drawing Sheets

SUPER RESOLUTION WEIGHTING BLENDING

BACKGROUND

Super resolution playback involves displaying images at higher resolution than what is transmitted and received. Super resolution allows the display of a higher quality image in the same amount of bandwidth by using information on how the lower resolution (broadcast) image was created. However, practical use of super resolution with current broadcast encoding is limited.

Generally, a super resolution playback process merges information from several low resolution frames to get a high resolution frame. To get extra information from other low resolution frames, those frames typically need to have non-integer pixel motion between the current frame and other frames to be merged. In order to be useful, the low resolution frames should also contain some aliasing or other characteristic that changes low resolution content based on the sampling phase in time or space. This allows the low resolution frames to provide more information to generate a super resolution frame.

Some super resolution processes usually include motion estimation modules to estimate the motion vectors to sub-pixel accuracy between pixels, blocks or regions from the current frame to other frames. Motion estimation has issues as it is difficult to get motion vectors for various scenarios, such as motion vectors for uncovered areas in an image. It is also more difficult to calculate high quality sub-pixel motion vectors when the low resolution frames contain aliasing because the aliasing creates a frequency component moving with a different motion vector. Techniques exist to model motion, such as translational, affine, or projective models, but typically the motion of all the pixels will not follow the model and inaccurate or wrong motion vectors are estimated. A robust super resolution algorithm will have a mechanism to refuse data with wrong and inaccurate motion vectors from the fusion of low resolution frames.

Some super resolution processes use robust statistics to avoid artifacts due to wrong motion estimation. These processes typically lead to more iterations of the process or prevent some of the correct motion from being used in the fusion. An approach that avoids confusing the data with inaccurate motion estimation with accurate motion estimation will result in recovering more detail for the super resolution frame while avoiding artifacts from the inaccuracies.

DETAILED DESCRIPTION OF THE EMBODIMENTS

Most super resolution processes take several low resolution image frames and combine them into a high resolution frame. The terms low resolution' and 'high resolution' are relative to each other. The native resolution of the low resolution frames is lower than the resulting high resolution frame. The conversion from low resolution to high resolution involves interpolation of pixels 'between' the pixels of the low resolution images based upon the information of the low resolution images.

The source of the low resolution image may be a camera, but may also include any other process that produces low resolution images. In general, the input image to the SR process is always considered the low resolution image because it is degraded relative to the intended image and the output image is consider the high resolution image because it is closer to the intended image. One example is the interlacing process, where an image frame is divided into two fields of the image data and recombined into an image frame at the receiving end. Each field may be used to create an image frame as part of the de-interlacing process, and the process of taking the field and converting it to a frame of image data may benefit from the embodiments here.

The high resolution image will then undergo a process to synthesize a low resolution image. The two images are compared and the result of the comparison provides feedback to the high resolution image to improve it. This process repeats until the original low resolution and the synthesized low resolution frame of image data have very few differences. This typically means that the synthesized high resolution image accurately reflects the actual high resolution image.

Figure 1:
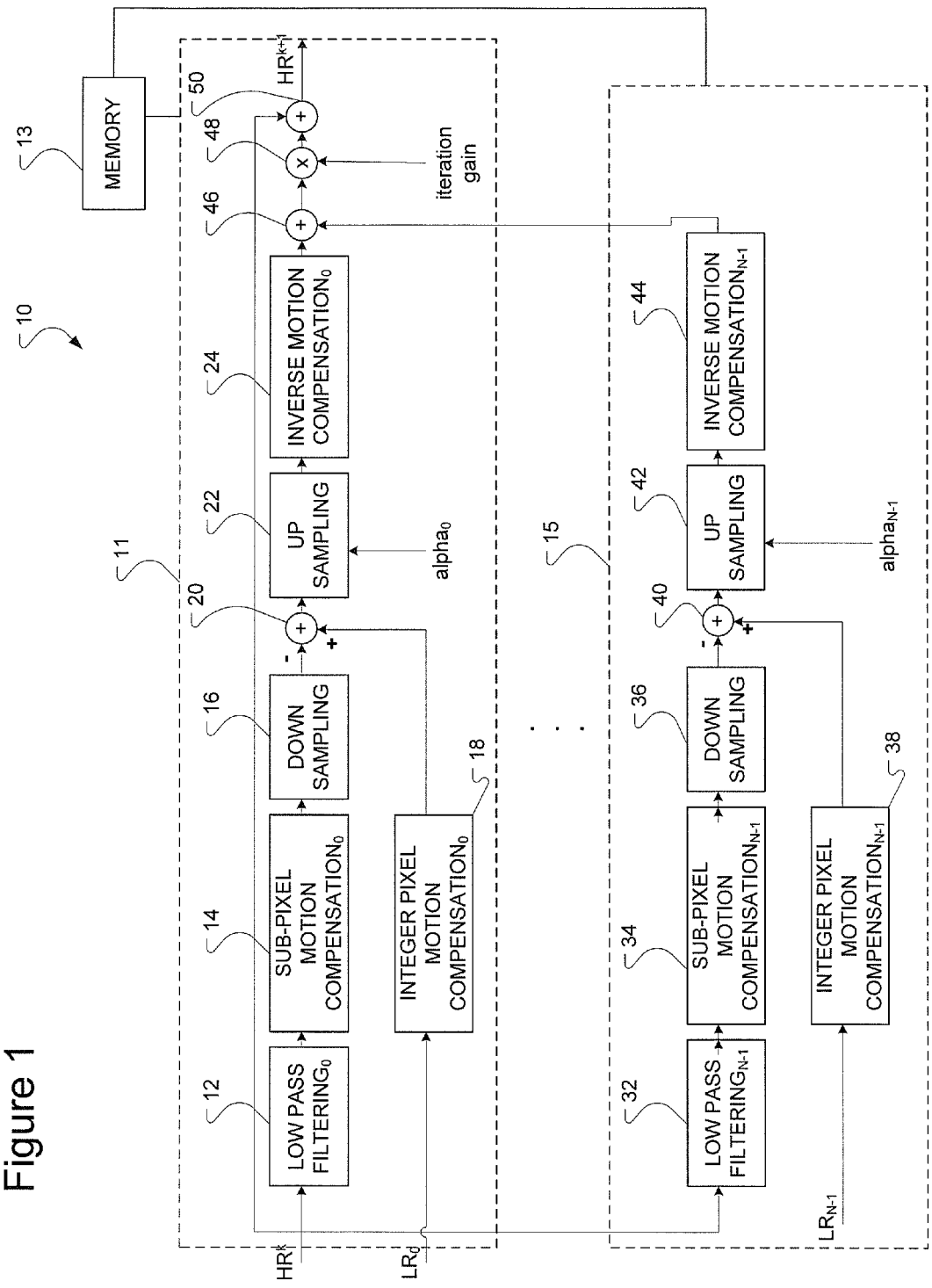
FIG. 1 shows a diagram of an embodiment of a super resolution playback process.
Figure 2:
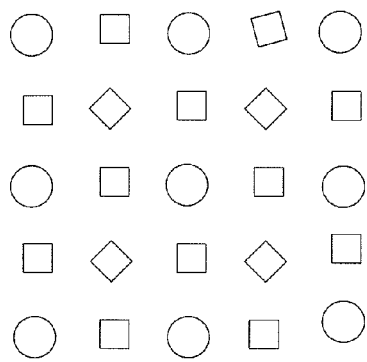
FIG. 2 shows an example of weighting a confidence factor according to sample position.

FIG. 1 shows an embodiment of a super resolution processor 10, which may take the form of a portion within a video processor, a post processor, or a dedicated Application Specific Integrated Circuit (ASIC). The embodiments may include a software implementation operating on a general purpose processor. For example, the super resolution processing of the data may occur in a general-purpose processor off line and then the data displayed in real-time. In this example, the processor would execute instructions in the form of code to perform super resolution processing on the image data.

In this example, the process operates on blocks of image data, where the blocks represent a portion of the frame or field of image data of the high resolution image. In FIG. 1, a block of the current (N) high resolution image estimate undergoes low pass filtering at 12. The process then shifts the low pass filtered estimate according to a sub-pixel motion vector at 14 and down samples the data at 16 to produce a simulated or synthesized low resolution block. The process splits the motion vectors into an integer part and a decimal part. The integer part applies to the low resolution frame ($LR_0$) at 18, and the sub-pixel motion compensation applies to the local high resolution block ($HR_N$) at 14. This saves on implementation area on the chip, as the process only requires a smaller portion of the high resolution data to be on the chip since that data is only shifted a fractional amount. The low resolution image typically requires one-quarter or less storage space in the memory 13 compared to a high resolution image to allow processing of a given amount of motion.

In the drawings, multiple LR frames exist, designated with a subscript number, from 0 to N−1, designated as 11 and 15 in the figure. The high resolution frames are designated by their iteration, from k to k+1. Alternatively, the process could apply the original motion vectors to the low resolution frames, applying the sub-pixel motion to the low resolution frames, or even no motion to the high resolution frame and both integer and sub-pixel motion to the low resolution frames. However, because there is more high frequency content close to the Nyquist limit in the low resolution blocks, doing sub pixel interpolation on the lower resolution blocks will introduce more errors into the synthesized high resolution image.

The process then finds the differences between the input LR block after integer-level motion compensation, and the simulated low resolution block at 20. The difference then undergoes upsampling at 22, and inverse motion compensation at 24. The upsampling process applies a confidence value, referred to here as alpha. The alpha value may represent the confidence of the block motion vector and is therefore sometimes referred to as 'motion alpha.' The alpha value will be discussed in more detail later. While shown here as part of the upsampling process, the application of the confidence value may occur before or after upsampling.

The process accumulates the resulting upsampled and shifted difference between the HR frame and $LR_0$ with the differences between the HR frame and other LR frames, as shown by blocks 32, 34, 36, 38 and 40 applied to the low resolution input frame N−1. At the upsampling 42, the confidence value, $alpha_{N-1}$, is applied to the simulated low resolution frame N−1. Similarly the motion compensation applied at 34 and the inverse motion compensation at 44 are for N−1. The accumulation occurs at 46. While only two frames of low resolution data are shown, the process is applied to low resolution frames from 0 to N−1 frames.

The process then takes the resulting accumulated differences from 46 and applies an iteration gain at 48. The iteration gain is the overall feedback gain for the process, the higher the gain, the faster the convergence, within some limits. Gains greater than 1 may overshoot the convergence point, causing an oscillation back and forth as you converge to the closest solution. A gain greater than 2 can result in an unstable system. Different iteration gains may apply to different iterations of the process.

The resulting information is then added to the estimated high resolution block at 50 to produce the next high resolution block, N'. The process would then repeat starting with the new estimate of the high resolution image, unless the resulting differences fell below some threshold set by the process to determine when the error had reached a small enough value, or the process has reached a predetermined number of iterations.

As mentioned above, the confidence value may reflect the confidence level of the motion vectors of the block. This may take the form of weighting of the alpha value. The embodiments discussed here adjust this weighting, using instead an adjusted confidence value. The confidence value may adjust based upon the position of the upsampled pixel, for example, with higher weight given to a position in the high resolution image that contributes more to the super resolution process in the low resolution pixel. Adjustments may also occur based upon local statistics and the target application. The target application consists of the application in which the high resolution image will be used, such as a higher resolution display, de-interlacing of interlaced data for display, etc.

Figure 3:
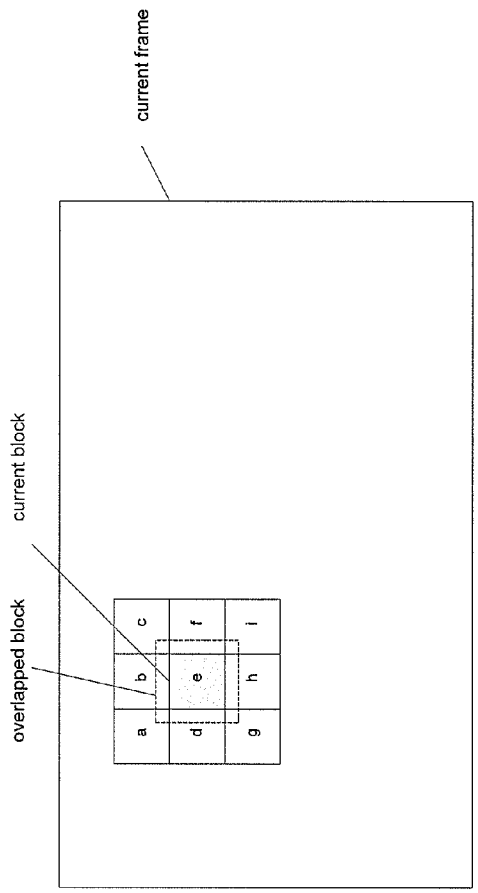
FIG. 3 shows an example overlapped blocks used in a super resolution process.

FIG. 3 shows an example of alpha adjustment based on sample position. In this figure, the circle position corresponds to the center of a low resolution pixel and its confidence value would be scaled by 1. The position represented by the squares would scale by 0.5 and the diamond position by 0.25. The confidence value adjusts based upon how close the upsampled pixel resides to the center of the input low resolution pixel.

Adjustment based upon local statistics involves adjusting the alpha value based upon the magnitude of the differences found at 20 in FIG. 1. These differences may take the form of the sum of absolute differences (SAD) or adjusted differences, such as the amount of detail in the block. This last may be referred to as SADNP, or sum of absolute differences with the nearest pixel. Other local statistics may include changes in the motion vector from frame to frame.

Sometimes the application may affect the adjustment. For example, super resolution may reduce noise in application where the input and output resolutions are the same. The super resolution process may receive one original input frame and several downsampled input frames to reduce cost and memory bandwidth. The confidence value may then adjust for the original input frame and the downsampled input frames. The adjustment may also result from noise level received or estimated in some other way. The original input frame would be used as the initial estimate for the higher resolution image and the downsampled frames the lower resolution images.

Typically, a motion alpha for each block results from motion estimation. The process and processor here adjust this value beyond a weighting of its confidence. Conversion from the motion alpha for a block to a pixel alpha must occur. The super resolution process here processes data blockwise and uses overlapped blocks to avoid blockiness artifacts. FIG. 3 shows an example of an overlapped block that covers 9 block motion alphas.

The super resolution process occurs one block at a time. Because the blocks overlap as shown in FIG. 3, the overlap regions in effect provide an extra iteration. The process applies lower alpha gain, resulting in a lower impact that helps reduce any block artifacts caused by using block based motion estimation.

To reduce the risk of artifacts, smooth pixel alphas around the block boundary are used. In FIG. 3 the central block is the current processing block and the block in dash line is the overlapped block. Each pixel inside the overlapped block will be assigned an alpha value. The assignment of the alpha values follows a set of rules.

If the alpha of the central block is grater than the alpha of a boundary block, the alphas of the pixels near the boundary of the central block are lowered so that they are smoothly changed to the alpha of the boundary block. If the alpha of the central block is lower than the alpha of a boundary block, the alphas of the pixels of the boundary block are all changed to the alpha of the central block.

Figure 4:
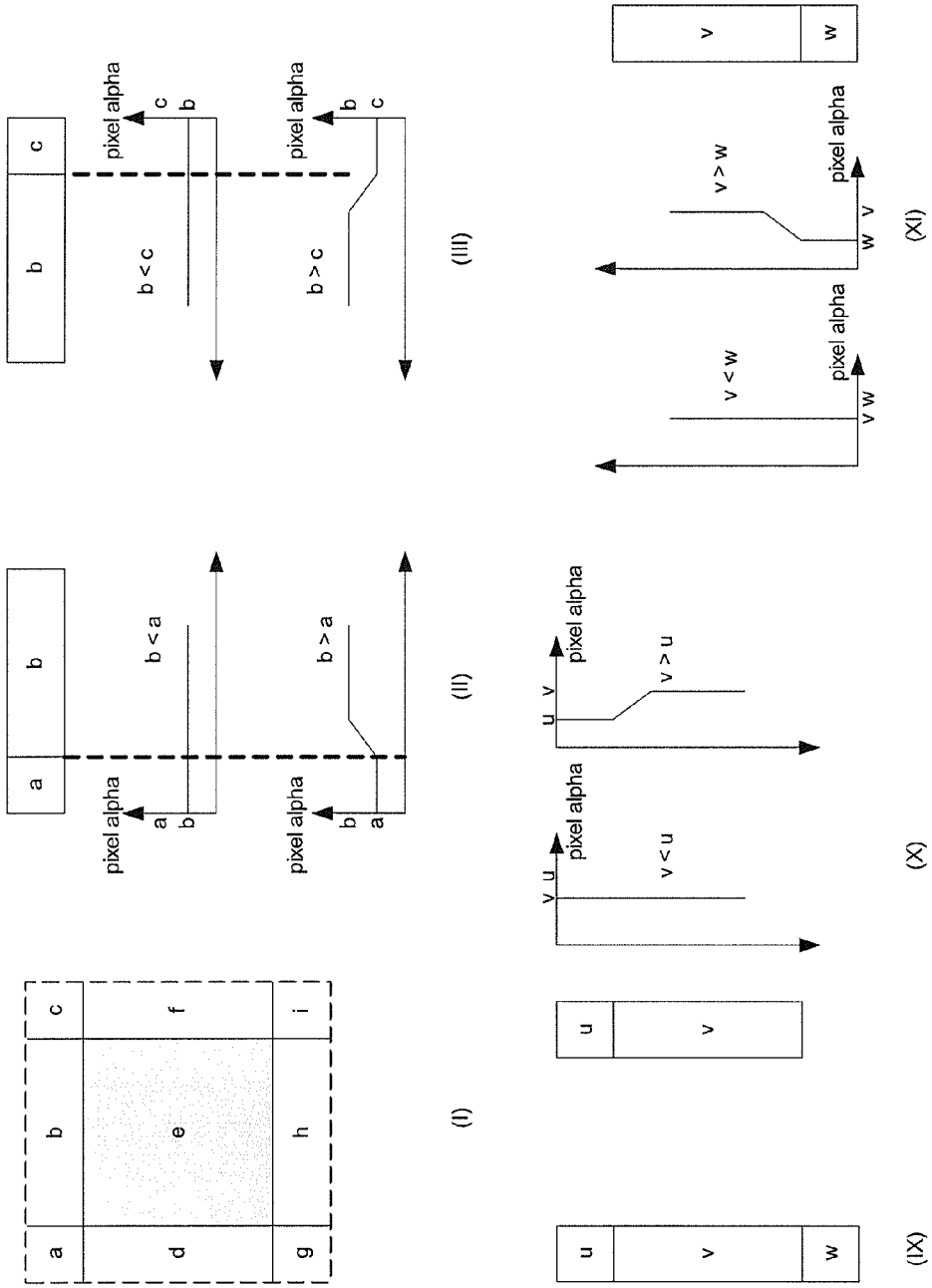
FIG. 4 shows an example of converting from a block confidence value to a pixel confidence value.

For example, suppose the alpha of top left block is a, as shown in the figure, and so for other blocks. To description convenience the top left block is also called as block a, and so for other blocks. First, the process performs horizontal conversion. Before the conversion the pixel alphas are shown as FIG. 4 (I). The process modifies the alpha of pixels around the boundary of block a and block b as shown in FIG. 4 (II). If b<a, the alphas of pixels of block a are changed to the alphas of block b, otherwise the alphas of pixels near the boundary in block b are lower so that the alpha smoothly changes smoothly. The same rule is applied to the pixels around the boundary of blocks d, e, g and h.

For the pixels around the boundary of blocks b, c, f, h and i, the process uses the rule of FIG. 4 (III). The horizontal conversion results in a pixel alpha block that changes smoothly in horizontal direction. The process then applies vertical conversion on the horizontally converted pixel alpha block. Each column of the pixel alpha block can be divided into three parts, as shown in FIG. 4 (IX), where the alphas in each part are the same. The process applies the rule of FIG. 4(X) to the pixels around the boundary of u and v, and applies the rule of FIG. 4(XI) to the pixels around the boundary of v and w. After each column undergoes conversion, the process generates the final pixel alpha block.

In this manner, more accurate motion estimation applied in the super resolution process allows for more accurate high resolution frames of data. This contributes to a more accurate resulting image with fewer artifacts.

Thus, although there has been described to this point a particular embodiment for a method and apparatus for super resolution playback, it is not intended that such specific references be considered as limitations upon the scope of this invention except in-so-far as set forth in the following claims.

What is claimed is:

1. A method of receiving video data, comprising:
   receiving two or more original images at a processing device;
   estimating a first image of higher resolution than the original image from the original image;
   generating a simulated image of the original image from the first higher resolution image by applying a low pass filter to the higher resolution image, producing a low pass filtered image, and shifting the low pass filtered image according to a sub-pixel motion vector to produce the simulated image;
   deriving difference data between the original image and the simulated image;
   upscaling the difference data, wherein upscaling includes weighting the difference data with an adjusted confidence value, wherein the confidence value is adjusted based upon local information; and
   using the upscaled difference data and the first higher resolution image to estimate a second higher resolution image to replace the first higher resolution image.

2. The method of claim 1, wherein using the upscaled different data to estimate the second higher resolution image comprises:
   splitting motion vectors for the higher resolution image into an integer part and a decimal part;
   applying the integer part to the low resolution image; and
   applying the decimal part to the second higher resolution image.

3. The method of claim 1, wherein the confidence value is adjusted according to a position of an upscaled pixel relative to a center of a corresponding low resolution pixel.

4. The method of claim 1, wherein the confidence value is adjusted according to local statistics.

5. The method of claim 4, wherein the local statistics are one of sum of absolute differences, sum of absolute differences with nearest pixel, changes in motion between frames, and peak values in a phase plane.

6. The method of claim 1, wherein the confidence value is adjusted based upon a target application of the new higher resolution image.

7. The method of claim 1, wherein the confidence value is adjusted at a boundary of blocks into which the first high resolution image is divided.

8. The method of claim 7, wherein the confidence value is adjusted depending upon a current confidence value of a central block and confidence values of blocks surrounding the central block.

* * * * *